United States Patent
Wrobel et al.

(10) Patent No.: US 7,798,562 B2
(45) Date of Patent: Sep. 21, 2010

(54) MOTOR VEHICLE WITH FRONT WALL CROSS MEMBER

(75) Inventors: Leszek Wrobel, Rutesheim (DE);
Matthias Herntier, Wurmberg (DE);
Jan Hogenmüller, Leonberg (DE);
Carsten Dreses, Wimsheim (DE)

(73) Assignee: Dr. Ing. h.c. F. Porsche AG, Stuttgart (DE)

( * ) Notice: Subject to any disclaimer, the term of this patent is extended or adjusted under 35 U.S.C. 154(b) by 98 days.

(21) Appl. No.: 11/944,702

(22) Filed: Nov. 26, 2007

(65) Prior Publication Data

US 2008/0122264 A1 May 29, 2008

(30) Foreign Application Priority Data

Nov. 25, 2006 (DE) .................. 10 2006 055 721

(51) Int. Cl.
*B60J 7/00* (2006.01)
(52) U.S. Cl. ..................... 296/193.02; 296/203.01
(58) Field of Classification Search ............ 296/193.02, 296/203.02, 187.01, 203.01
See application file for complete search history.

(56) References Cited

U.S. PATENT DOCUMENTS

| | | | |
|---|---|---|---|
| 5,562,329 A * | 10/1996 | Srock et al. ............ | 296/203.01 |
| 6,168,228 B1 * | 1/2001 | Heinz et al. ............ | 296/187.12 |
| 6,523,878 B2 * | 2/2003 | Scheidel ................ | 296/70 |
| 6,619,729 B2 | 9/2003 | Kimura et al. | |
| 6,981,736 B2 * | 1/2006 | Morsch et al. .......... | 296/193.07 |
| 7,291,785 B2 * | 11/2007 | Riester et al. ........... | 296/70 |
| 7,377,578 B2 * | 5/2008 | Ellison et al. .......... | 296/193.07 |
| 2002/0195840 A1 * | 12/2002 | Mishima et al. ........ | 296/203.01 |
| 2003/0006629 A1 * | 1/2003 | Kimura et al. .......... | 296/203.03 |
| 2008/0054681 A1 * | 3/2008 | Ellison et al. .......... | 296/193.02 |
| 2008/0122260 A1 * | 5/2008 | Meier .................... | 296/190.08 |
| 2008/0122264 A1 * | 5/2008 | Wrobel et al. .......... | 296/203.02 |

FOREIGN PATENT DOCUMENTS

| | | |
|---|---|---|
| DE | 3419002 A1 | 11/1985 |
| EP | 1228948 A1 | 8/2002 |
| EP | 1264757 A2 | 12/2002 |
| JP | 2002145124 A | 5/2002 |
| JP | 2005206107 A | 8/2005 |

* cited by examiner

*Primary Examiner*—Kiran B. Patel
(74) *Attorney, Agent, or Firm*—Laurence A. Greenberg; Werner H. Stemer; Ralph E. Locher

(57) ABSTRACT

A motor vehicle contains two A pillars, a front wall, a central tunnel and a front wall cross member. The front wall cross member has two side parts which are attached to the A pillars of the motor vehicle, and a middle part connecting these two side parts. The side parts are shaped in such a way that they are in at least partial contact with the front wall of the motor vehicle and are attached to the front wall there. The middle part is in at least partial contact with the central tunnel of the motor vehicle.

6 Claims, 2 Drawing Sheets

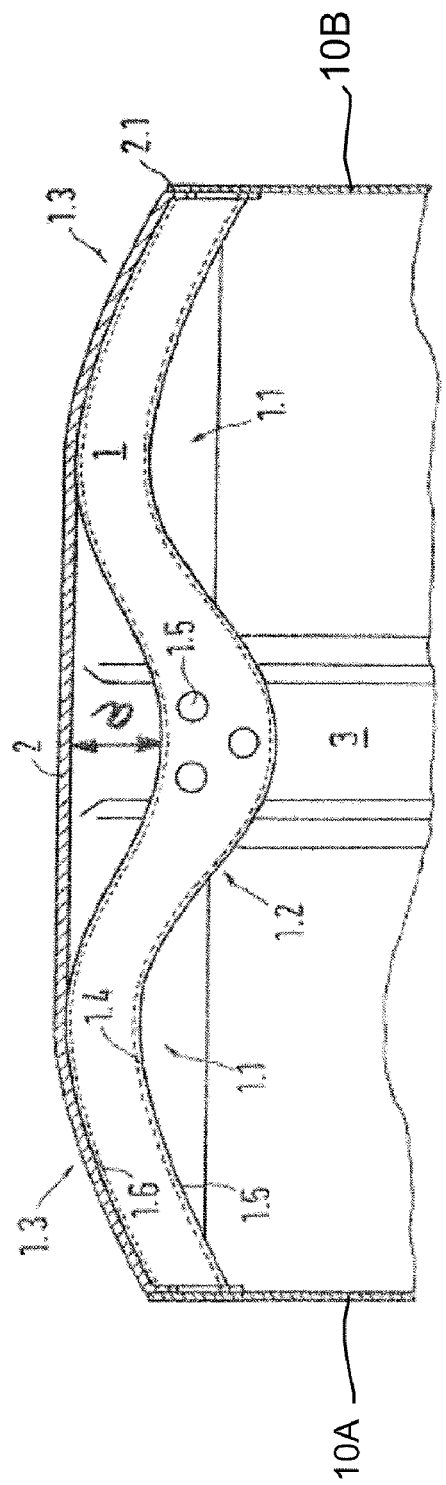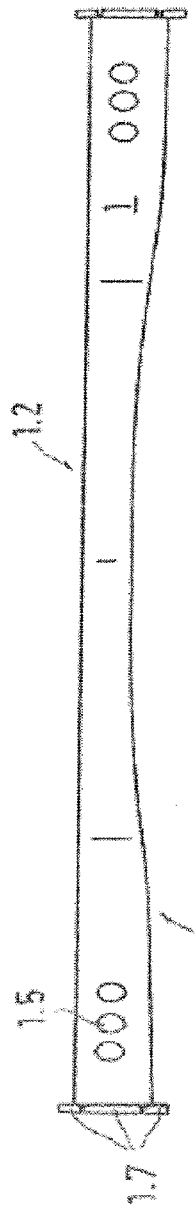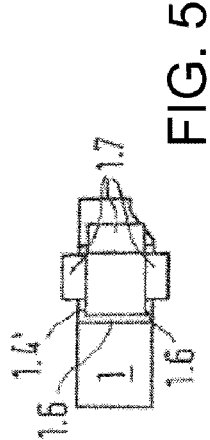

MOTOR VEHICLE WITH FRONT WALL CROSS MEMBER

CROSS-REFERENCE TO RELATED APPLICATION

This application claims the priority, under 35 U.S.C. §119, of German application DE 10 2006 055 721.2, filed Nov. 25, 2006; the prior application is herewith incorporated by reference in its entirety.

BACKGROUND OF THE INVENTION

Field of the Invention

The present invention relates to a motor vehicle, in particular a passenger vehicle having a front wall cross member.

A motor vehicle contains in general two A pillars disposed at the side, a front wall dividing the front end from the passenger space and a central tunnel which reinforces a floor plate of the vehicle and/or can accommodate a drive train, in particular a universal shaft. The A pillars, the front wall, the central tunnel and the floor plate of the motor vehicle may be configured to be separate from one another but they are preferably interlinked for reinforcement of the vehicle.

Such a motor vehicle should be sufficiently rigid to improve the driving properties but also in the event of a side impact in the transverse direction of the vehicle. At the same time, the front end should penetrate into the passenger space as little as possible to protect the passengers in the event of a front impact.

To increase the rigidity of the motor vehicle in the transverse direction of the vehicle, it is known from German Utility Model DE 91 07 489 U1 that a cross member formed of two rectangular parts and a cross strut connecting them and extending around a cardan tunnel may be provided in the front part of a vehicle body. The cross member is connected to sillboard reinforcements in the longitudinal direction of the vehicle to form a box frame. Published, European patent EP 1 382 514 A1 describes the use of a floor pan having a front and a rear floor cross member and a seat cross member for this purpose. Published, European patent EP 1 264 757 A2 proposes two separate cross members for reinforcement, each being connected to an A pillar at one end and to a central tunnel at the other end.

It is known from published, non-prosecuted German patent application DE 10 2004 060 190 A1 that to avoid penetration of the front end into the passenger space, a cross member may be welded to the A pillars and additionally supported on flanges, which are in turn secured by bolts on longitudinal members of the motor vehicle and thereby support a front wall.

With all the approaches mentioned above, it is a disadvantage that a side part of a cross member uses only one part of the available supporting options of the A pillar, central tunnel, front wall and the opposing side part.

Therefore, published, non-prosecuted German patent application DE 103 38 389 A1 proposes a cross member having two side parts, each of which is connected to an A pillar of the vehicle and a vertical front wall member. The two vertical front wall members are in turn interconnected by the cross member, which may in turn be connected by struts to the central tunnel. Each side part thus directly or indirectly utilizes all available supports.

Forces that act on the front wall in the event of a front impact, for example, are therefore absorbed by the vertical front wall members and transferred from there directly into longitudinal members on the floor and connected thereto on the one hand and on the other hand transferred indirectly to the A pillars and the central tunnel via the cross member, which is connected to the vertical front wall members, the cross strut in turn being connected to the central tunnel by struts.

It is a disadvantage that the flow of forces from the front wall involves multiple transfer points (e.g., from the front wall first into the vertical front wall members, from the vertical front wall members into the cross member, from the cross member into the struts connecting the cross member to the central tunnel and finally from the struts into the central tunnel).

Such transfer points must be able to absorb all the forces that are to be transferred and therefore must be dimensioned with enough strength, which increases the cost of manufacturing as well as the total weight of the vehicle in a deleterious manner. At the same time, such transfer points interfere with the flow of force and have the disadvantage that they form weak points, which can fail in the event of an accident or during operation of the vehicle, e.g., because of the resulting torsion.

BRIEF SUMMARY OF THE INVENTION

It is accordingly an object of the invention to provide a motor vehicle with a front wall cross member that overcomes the above-mentioned disadvantages of the prior art devices of this general type, in which forces are diverted into the vehicle body as well as possible, these forces being in particular the transverse forces acting on an A pillar during operation or in a side impact and/or the longitudinal forces acting on the front wall in a front impact.

With the foregoing and other objects in view there is provided, in accordance with the invention, a motor vehicle. The motor vehicle contains two A pillars, a front wall, a central tunnel, and a front wall cross member having two side parts attached to the A pillars and a middle part connecting the two side parts. The side parts are shaped such that they are at least partially in contact with the front wall and connected to the front wall there. The middle part is at least partially in contact with the central tunnel and disposed at a distance from the front wall.

An inventive motor vehicle contains two A pillars, a front wall and a central tunnel in an generally known manner. The front wall is preferably connected to the A pillars and the central tunnel, e.g., by welding and/or adhesive bonding, or it is configured to be integral with parts of the A pillars and/or the central tunnel. The term "A pillar" refers to the front parts of the vehicle body defining the passenger space, the front parts extending generally vertically, and may likewise comprise the actual vehicle body elements, metal plates (of which these body elements may be assembled in multiple parts) and/or metal plates which at least partially surround these body elements.

An inventive motor vehicle additionally contains a front wall cross member having two side parts and a middle part connecting them. The side pasts are each connected to an A pillar of the motor vehicle at their end facing away from the middle part. This creates a continuous support between the two A pillars in the transverse direction of the vehicle.

The side parts are shaped according to this invention such that they are in at least partial contact with a front wall of the vehicle and are connected there to the front wall, with a middle part of the front wall cross member running at a distance from the front wall. Due to this direct connection of the side parts to the front wall in areas where they are in contact with the front wall, this advantageously eliminates a deflection of the flow of force first to vertical front wall members and only from there into the front wall cross member. The forces are instead initiated directly from the front wall into the front wall cross member. Furthermore, the front wall and the front wall cross members are supported in a form-fitting manner against one another by partial mutual contact, which further improves the introduction of force from one component into the other. Furthermore, the contact of the front wall cross member with the front wall facilitates their direct connection to one another.

Due to the inventive approach of the front wall cross member extending between the A pillars to the front wall, the front wall member may thus be supported on the front wall and may additionally be attached directly to it. In this way, forces acting on the front wall can be diverted directly into the A pillars via the front wall cross member. Conversely, the front wall cross member can transfer forces acting on an A pillar directly to the opposing A pillar as well as the front wall.

The middle part of the inventive front wall cross member is at least partially in contact with the central tunnel of the motor vehicle. In this way, the front wall cross member is additionally supported directly on the central tunnel in a form-fitting manner. Forces introduced from the front wall or an A pillar into the front wall cross member may additionally be transferred directly into the central tunnel. For example, the forces absorbed by an A pillar in a side impact may be diverted via the front wall cross member to the central tunnel with which it is in contact, the front wall, to which the front wall cross member is directly attached, and the opposing A pillar to which it is also directly attached.

Due to the direct support in multiple points, the rigidity of the vehicle, in particular in the transverse direction of the vehicle, can be increased in an advantageous manner. In addition, penetration of the front end into the passenger space can also be reduced, so that driving safety and accident prevention safety can likewise be increased with a front wall cross member according to the present invention.

In addition, due to the direct support on the front wall and the central tunnel and the direct connection to the front wall, additional vertical front wall members or struts and their connection to the front wall cross member may be omitted, which can advantageously reduce the weight and the cost of manufacturing.

On the whole, a direct and undisturbed flow of force is the result in the front wall cross member, which is in contact with the central tunnel and the front wall and is attached there directly to the front wall. By this direct undisturbed flow of force, forces acting on the front wall and/or an A pillar can be diverted into the remaining vehicle body in a more harmonious manner. Such a more harmonious flow of force allows greater forces to be transferred in smaller cross sections, so that the front wall cross member can be configured to be weaker and therefore lighter and/or the rigidity and strength can be increased.

The shape of the middle part and/or the side parts of the front wall cross member is determined in sections by the contour of the central tunnel and/or the front wall area with which the front wall cross member is contact. Surface contact of the front wall member with the central tunnel and/or the front wall, especially over a large area, is preferred because in this way the compressive and shear stresses to be transmitted are reduced.

Likewise, the front wall member need not be completely in contact with the central tunnel and/or the front wall. This increases the design freedom and may make it possible in particular to join the areas that are in contact with the front wall and central tunnel in a harmonious manner, i.e., in an advantageous form for the transmission of force, e.g., via curves. In addition, space for additional components, e.g., parts of an air conditioning system, automotive electronics, vehicle steering or the like can thus be created between the front wall cross member and the front wall and/or the central tunnel.

It is possible in particular to also support A pillars that have been drawn further toward the rear with an inventive front wall cross member in the longitudinal direction of the vehicle because the front wall cross member is carried back from these A pillars to the front wall and is at least partially in contact with them so that it advantageously takes up only a small amount of space in the passenger compartment. From the connection to the front wall, the front wall member may then be drawn toward the rear again in the longitudinal direction of the vehicle for contact with the central tunnel, so that the supports of the front wall cross member on the A pillars and the central tunnel lie closer together in the longitudinal direction of the vehicle. In this way, the effective lever arms and thus the bending torques that occur in the front wall cross member can be reduced advantageously.

The side parts are preferably attached to the front wall by screw connection, rivets, adhesive bonding and/or welding, in particular by spot welding. Spot welding at one or more welding spots in particular allows an easy measure for a permanent and reliable connection that can be established rapidly.

In a preferred embodiment, the middle part is also attached to the central tunnel. In this way the support is further reinforced and tensile and shear forces can also be diverted from the front wall cross member into the central tunnel. This improves the support of the A pillars and the front wall on the central tunnel and thus further increases the rigidity and stability of the overall arrangement. Thus, this creates on the whole a self-reinforced unit of a front wall, a front wall cross member, A pillars and the central tunnel. The connection is preferably accomplished by screw connection, riveting, adhesive bonding and/or welding, in particular spot welding.

The contact surfaces of the front wall cross member with the front wall and the central tunnel are preferably situated in different planes and/or disposed in different directions in space. For example, the front wall cross member may be generally in contact with the front wall from the rear in the transverse direction of the vehicle, for example, and may be attached to it while it is generally in contact with and attached to the central tunnel from above in the vertical direction of the vehicle. Thus, readily accessible and easy-to-assemble connection positions can be created. Furthermore, such large surfaces of the front wall and/or the central tunnel can be used for connection without significantly reducing the passenger compartment. In addition, such a front wall cross member is advantageously supported in a form-fitting manner in all three directions in space: in the longitudinal direction of the vehicle, it is supported against the front wall; in the transverse direction of the vehicle, it is supported against the A pillars, and in the vertical direction of the vehicle, it is supported against the central tunnel.

The side parts may also be attached to the A pillars of the vehicle by screw connection, riveting, adhesive bonding and/or welding, in particular spot welding. It is not necessary here to configure each connection by the same technique. For example, the front wall cross member may be attached to the front wall and to the central tunnel by spot welding and to the A pillars by adhesive bonding. In this way, as described above, a permanent, reliable and easy attachment of the front wall member to the front wall and the central tunnel can be established quickly, while on the other hand, the adhesive bond between the front wall member and the A pillars can dampen vibrations in the vehicle body as well as dampening micromovements of the components with respect to one another and can at least partially compensate the manufacturing tolerances or thermal expansion and welding deformation that occur, e.g., as a result of spot welding, for example.

The side parts may have a flange configuration for connection to the A pillar on the end that is attached to the A pillar. This may advantageously increase the connection surface, which reduces the stresses to be transmitted and thus increases the strength of the connection and the rigidity of the arrangement as a whole. The connection to the A pillar may be accomplished directly or via a metal plate, which at least partially surrounds and is attached to the A pillar.

In a preferred embodiment, the side parts and/or the middle part are configured as hollow profile(s). A hollow profile advantageously has a high torsional rigidity and may thus increase the torsional rigidity of the entire arrangement in a front wall cross member that is curved in the transverse and/or vertical directions of the vehicle. Furthermore, it has a high flexural rigidity with a relatively low weight and can thus increase the rigidity in the longitudinal, transverse and/or vertical directions of the vehicle.

The hollow profile may preferably have areas with an outer contour that is complementary to the contour of the front wall and/or the central tunnel to thereby ensure form-fitting contact that is as optimal possible. In particular, the hollow profile may have areas with a flat side for coming in contact with the front wall and/or the central tunnel. The front wall cross member may have a box section in some areas, with different areas having box sections of different dimensions and thus being adaptable to the boundary conditions of the connection, such as the contour of the front wall and/or the central tunnel, the available space and/or the forces to be transmitted.

A first wall of the hollow profile may have one or more openings through which one or more spot welds on a second wall of the hollow profile are accessible. In this way the advantages of the box section and spot welding as mentioned above can be combined, and spot welding can be performed easily, in particular not requiring any special tools that can be inserted from the front side into the box section.

In a preferred embodiment, an opening through which an arm of an electrode holder can be inserted and guided to the welding spot is provided opposite each welding spot in the hollow profile. The welding spot produced by the electrode holder then connects the second wall of the hollow profile to the front wall and/or the central tunnel. At the same time, a plurality of smaller openings, which only allow access of the electrode holder arm to the spot weld, weaken the strength of the hollow profile only slightly. Likewise it is also possible to provide fewer openings than spot welds and to dimension them and arrange them in such a way that multiple spot welds are accessible through one opening. The second wall need not be opposite the first wall but instead may also be connected to it at an angle.

In an especially preferred embodiment, the middle part and the side parts are configured in one piece with one another. This avoids connections between the individual parts of the front wall cross member, which would interfere with the flow of forces and therefore it increases the strength and rigidity of the entire arrangement while at the same time allowing a reduction in the weight of the front wall cross member due to the lack of connecting points.

The front wall cross member is advantageously produced by an internal high-pressure method. This method, in which a semifinished product in the form of a hollow profile, in particular made of steel, is brought the desired shape by applying a high pressure in the interior of the hollow profile, is especially suitable for manufacturing a front wall member in the form of a hollow profile with its shape adapted to the contour of the front wall and the central tunnel. Other manufacturing methods, in particular steel (high-pressure) die casting, deep drawing, cold or hot forming or welding of multiple individual parts are of course also possible.

The side parts preferably protrude forward in a convex shape with respect to the middle part in the longitudinal direction of the vehicle. The side parts may be configured generally in the shape of a bow, so that the entire front wall cross member has approximately the shape of a so-called recurve bow. In this way, A pillars arranged behind the front wall in the longitudinal direction of the vehicle may be supported on an area of the central tunnel that is also disposed behind the front wall without resulting in high bending torques about the vertical axis of the vehicle. At the same time, the areas of the front wall cross member situated between the A pillars and the central tunnel may be brought toward the front wall and be attached to it there, not only increasing the rigidity of the vehicle but also advantageously only slightly reducing the available space in the passenger compartment.

Furthermore, the side parts protruding forward in a convex shape counteract penetration of the front end into the passenger space because first the curvature of the side parts must be indented, but this is supported on both sides on the A pillar and/or the central tunnel. The resulting plastic deformation of the front wall cross member can absorb part of the impact energy. In addition, such a front wall cross member is more stable to resist buckling in the longitudinal direction of the vehicle and therefore also reduces penetration of the front end into the passenger space. In addition, such a front wall cross member is lengthened in the transverse direction of the vehicle with the middle part set back in comparison with the side parts so that in a front impact, the front end must trigger plastic deformation of a greater amount of material, therefore also reducing penetration into the passenger space.

Due to the fact that the side parts protrude forward in a convex shape, a front wall cross member may also conform to the front wall especially well and may be in contact with it in wide areas.

If the central tunnel is connected to the front wall, the transitional areas between the central tunnel and the front wall, with the various small radii and free-form surfaces which usually occur between the central tunnel and the front wall, may be bridged by the middle part of the front wall cross member drawn toward the rear, so that the front wall cross member can have a relatively simple overall contour. Therefore, in a preferred embodiment, the side parts of the front wall cross member are in contact with the front wall only in their end areas, which face away from the middle part, whereas they are at a distance from the front wall in a transitional area to the middle part.

In addition, due to the middle part of the front wall cross member which is at a distance from the front wall and against the direction of travel toward the rear—the front wall continues to pass through it—the engine which is set back cannot damage the front wall cross member in the event of a crash. The structure and function of the shell are largely preserved. Therefore, the so-called crash length and/or crash distance is lengthened and the loads on the occupants are reduced. With traditional configurations, the cross member of the front wall forms a so-called box section and the front wall cross member is shifted so far forward, as seen in the direction of travel, that in the event of a crash, the engine is shifted toward the rear against the direction of travel and therefore damages the front wall cross member. This is avoided with the inventive front wall cross member.

Other features which are considered as characteristic for the invention are set forth in the appended claims.

Although the invention is illustrated and described herein as embodied in a motor vehicle with a front wall cross member, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 3 is a top, plan view of the front wall cross member;

FIG. 4 is a view of the front wall cross member from FIG. 2 in a longitudinal direction of the vehicle from a rear; and FIG. 5 is a view of the front wall cross member from FIG. 2 in the transverse direction of the vehicle from the left.

DETAILED DESCRIPTION OF THE INVENTION

Figure 1:
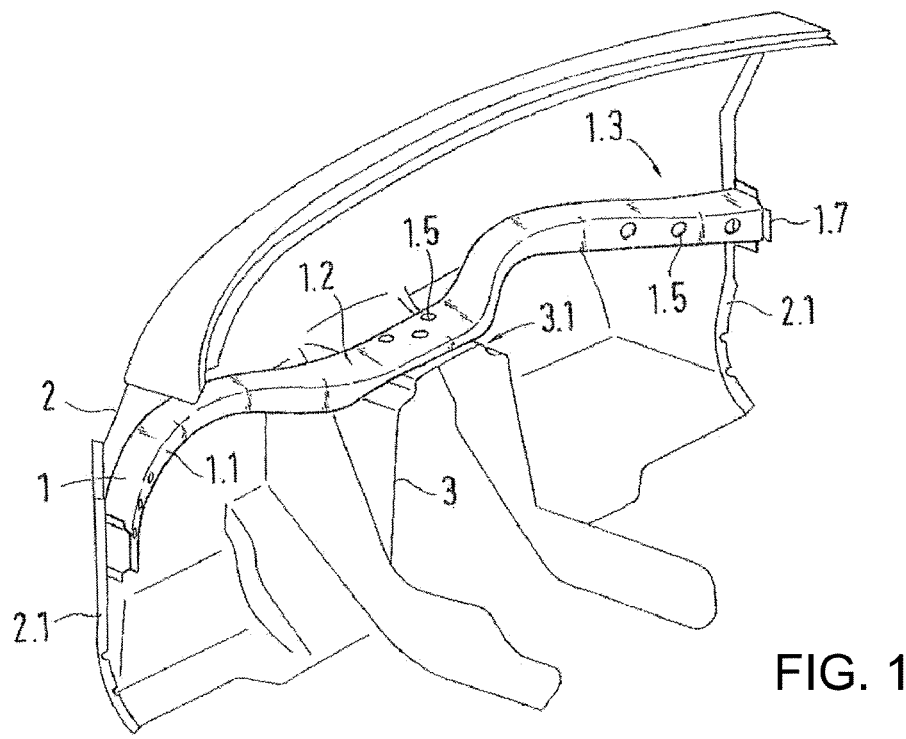
FIG. 1 is diagrammatic, perspective view of a front part of a motor vehicle according to one embodiment of the invention with a front wall cross member.
Figure 2:
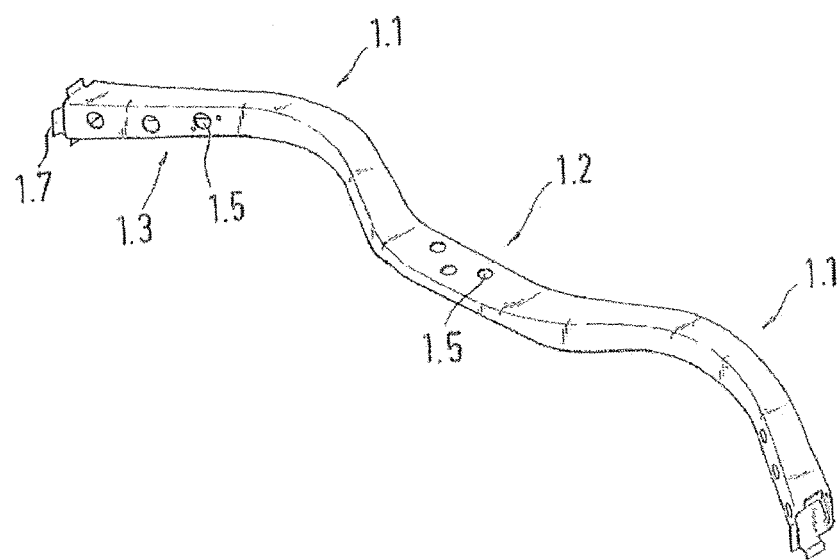
FIG. 2 is a diagrammatic, perspective view of the front wall cross member.

Referring now to the figures of the drawing in detail and first, particularly, to FIG. 1 thereof, there is shown a front part of the body of a passenger vehicle according to one embodiment of the present invention in a perspective view with a front wall cross member 1, a front wall 2, a central tunnel 3 connected thereto, e.g., by welding or adhesive boding and two non-illustrated A pillars likewise connected by welding or adhesive bonding, for example. For attachment of the A pillars, the front wall 2 has lateral flange areas 2.1. FIG. 3 shows the front wall cross member 1 from above in the vertical direction of the vehicle to illustrate the front wall 2, the central tunnel 3 and the A pillars 10A 10B in the installed positions.

The front wall cross member 1 may be shaped in one piece from a hollow steel profile by using a high internal pressure. It contains a generally box-shaped middle part 1.2 and side parts 1.1 that are connected thereto in the transverse direction of the vehicle and also have a generally box-shaped cross section. The side parts 1.1 are narrower and higher than the middle part 1.2, as can be seen in FIGS. 3 and 4 in particular, so the front wall cross member, starting from a free end of a side part 1.1, broadens in its middle part 1.2 in the longitudinal direction of the vehicle (FIG. 3) and becomes narrower in the vertical direction of the vehicle (FIG. 4). Thus the front wall cross member 1 may advantageous be manufactured from an originally generally constant box-shaped hollow profile by an internal high pressure without any great thickening or thinning of the material and it advantageously has a large bearing surface in the vertical direction of the vehicle in middle part 1.2, and a large bearing surface in the transverse direction of the vehicle in its side parts 1.1. Furthermore, severe local deformation, which would weaken the strength and rigidity of the front wall cross member 1, can be advantageously prevented or reduced by the internal high-pressure method.

The side parts 1.1 run generally in a bow shape, starting from the middle part 1.2 and protruding in a convex shape with respect to the middle part 1.2 in the longitudinal direction of the vehicle (FIG. 3). In their end areas 1.3, which face away from the middle part 1.2 and extend from a free end of the front wall cross member 1 approximately up to the crown point of a curved side part 1.1 in the exemplary embodiment, the side parts 1.1 are adapted to the contour of the front wall 2 on their front outside in the longitudinal direction of the vehicle, so that they are in flush contact with it in the installed state.

In these areas 1.3, three through-holes 1.5 are formed in a first wall 1.4 in the longitudinal direction of the vehicle (indicated with dash-dot lines in FIG. 3), the spot welds on a second front wall 1.6 in the longitudinal direction of the vehicle opposite the first wall 1.4 being accessible through these through-holes for an arm of a non-illustrated electrode holder.

In its middle part 1.2, the front wall cross member 1 also has three through-holes 1.5 in another first upper wall 1.4' in the vertical direction of the vehicle, the spot welds on another second lower wall 1.6' in the vertical direction of the vehicle opposite the additional first wall 1.4' being accessible through these through-holes for an arm of a non-illustrated electrode holder. The middle part 1.2 is disposed at a distance from the front wall 2, so that buckling of the front wall in a crash is not obstructed.

In the lower area of the front and rear outside, as seen in the longitudinal direction of the vehicle, and the lower outside in the vertical direction of the vehicle, the middle part 1.2 in the installed state is adapted to and accommodated in a receptacle recess 3.1 in the central tunnel 3 in a form-fitting manner.

On its free ends, the front wall cross member 1 has three flanges 1.7 for connection to the A pillars, the flanges 1.7 being produced by bending over appropriate sections of the box section.

For installation, the front wall cross member with its middle part 1.2 is inserted into the receptacle recess 3.1 of the central tunnel 3, which is already connected to the front wall 2 and thereby centered in an installed position. The end areas 1.3 of the side parts 1.1 are in contact here with the front wall 2, while the transitional area of the front wall cross member connecting these end areas 1.3 and the middle part 1.2 is at a distance from the front wall 2 and therefore need not be adapted to the free-form surface, wherein the front wall 2 develops into the central tunnel 3. The flanges 1.7 on the free ends of the front wall cross member 1 are in contact with the A pillars of the passenger vehicle in this state, the A pillars being connected to the front wall 2 via the flange areas 2.1 at the sides.

One arm of a non-illustrated electrode holder passes through the opening 1.5 in the first wall 1.4' of the middle part 1.2 and attaches the second wall 1.6' of the middle part 1.2 to the central tunnel 3 by spot welding, the second wall 1.6' also being in contact with the central tunnel. In the same way, an arm of a non-illustrated electrode holder passes through the openings 1.5 in the first wall 1.4 of the side parts 1.1 and connects the second wall 1.6 of the end area 1.3 by spot welding to the front wall 2 with which the end areas 1.3 are in contact.

The flanges 1.7 are adhesively bonded to the non-illustrated A pillars on their outer surface in the transverse direction of the vehicle with which they are in contact with the A pillars.

The aforementioned assembly steps may be performed in any order. For example, first the front wall cross member 1 may be attached to the central tunnel 3 by the spot welding described above and then connected to the front wall 2 before the A pillars are attached thereto at the sides and thereby at the same time adhesively bonded to the flanges 1.7.

As shown in FIG. 1 and FIG. 3 in particular, the front wall cross member 1 is supported in surface contact with the front wall 2 and/or the central tunnel 3 in its end areas 1.3 and its middle part 1.2. In addition, it is directly attached to the front wall 2 and/or the central tunnel 3 at these points. The front wall cross member is also supported with its flanges 1.7 in surface contact with the A pillars and is also directly connected thereto by adhesive bonding.

Due to this surface contact and the direct connection there, forces acting on an A pillar or the front wall 2 can be transferred directly and with a generally undisturbed flow of force into the central tunnel 3, an opposite A pillar and/or the front wall 2. This direct transfer of force between the front wall cross member 1 on the one hand and the A pillar, the front wall 2 and/or the central tunnel 3 on the other hand improves the distribution of force in the front wall cross member and thereby increases the rigidity of the vehicle in the transverse direction of the vehicle as well as in the longitudinal direction of the vehicle and in particular reduces penetration of the front end into the passenger space, which is separated from it by the front wall 2.

Due to the bow-shaped configuration of the side parts 1.1 protruding forwarding in a convex shape, the side parts being in contact with the front wall only in partial areas (their end areas 1.3 in the exemplary embodiment) and connected there, A pillars which are offset toward the rear in the longitudinal direction of the vehicle and a receptacle recess 3.1 in the central tunnel 3, the recess also being offset toward the rear in the longitudinal direction of the vehicle, may also be connected via the front wall cross member 1 without having to follow the free-form surface, which is usually complex, in the transitional area between the front wall 2 and the central tunnel 3. This simplifies the shape of the front wall cross member 1, which in this exemplary embodiment is configured generally in the form of a recurve bow, such as that known from the sport of archery.

In addition, the front wall cross member 1 leading from the A pillars and/or the central tunnel 3 to the front wall 2 only slightly reduces the space available in the passenger space while at the same time providing space for additional vehicle components, e.g., parts of a non-illustrated automotive air conditioning system in its area (essentially its middle part 1.2 and the transitional area to its end areas 1.3) which is at a distance from the front wall 2.

The configuration of the bow-shaped side parts 1.1, which protrude forward in a convex shape and are attached to the A pillars and the middle part 1.2, which is offset toward the rear in the longitudinal direction of the vehicle, advantageously reduces penetration of the front end into the passenger space because the front wall 2 must first cause plastic deformation of the convex bulges in the side parts 1.1. In comparison with front wall cross members extending generally in the transverse direction of the vehicle, where shear stresses alone occur on the lateral connections, this increases the energy absorption and the rigidity of the front wall cross member into whose lateral connections forces are partially diverted as compressive stresses.

The invention claimed is:

1. A motor vehicle, comprising:
   two A pillars;
   a front wall having side portions with curvatures;
   a central tunnel; and
   a front wall cross member having two side parts attached to said A pillars, said front wall cross member having a middle part disposed between said two side parts, said side parts shaped such that they contact said front wall, said front wall being connected to said side parts, said middle part of said front wall cross member contacting said central tunnel and disposed at a distance from said front wall, said side parts of said front wall cross member having curvatures matching said curvatures of said side portions of said front wall;
   said front wall cross member including a concave section formed between said side parts and located above said central tunnel;
   said concave section spaced away from said front wall by a distance (a); and
   said side parts projecting forward in a convex manner in a longitudinal direction of the vehicle relative to said middle part.

2. The motor vehicle according to claim 1, wherein said middle part is connected to said central tunnel.

3. The motor vehicle according to claim 1, wherein said side parts of said front wall cross member have flanges for connection to said A-pillars.

4. The motor vehicle according to claim 1, wherein said middle part and said side parts are configured in one piece with one another.

5. The motor vehicle according to claim 1, wherein said front wall cross member is manufactured by an internal high-pressure method.

6. The motor vehicle according to claim 1, wherein said central tunnel has a receptacle recess formed therein for form-fitting with said middle part of said front wall cross member.

* * * * *